3,623,303
COTTON PICKER LOW BOLL LIFTER
Louis Nickla, Memphis, Tenn., assignor to International Harvester Company, Chicago, Ill.
Filed Feb. 12, 1970, Ser. No. 10,830
Int. Cl. A01d 45/18
U.S. Cl. 56—44                                                    10 Claims

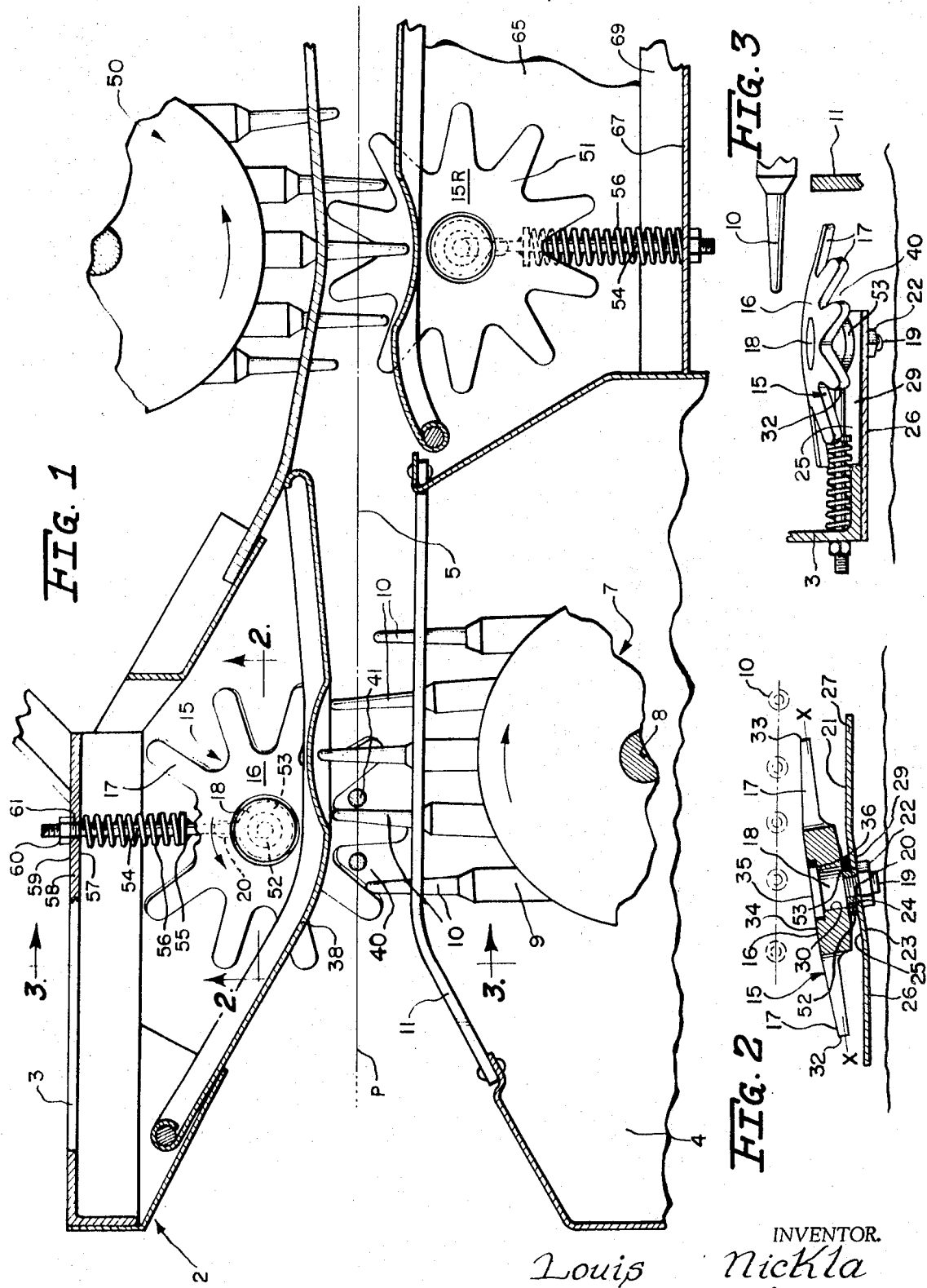

ABSTRACT OF THE DISCLOSURE

A lifter for low cotton bolls comprising a rotor with radial fingers, the rotor disposed to rotate on an upwardly and forwardly inclined axis and yieldably mounted at the compressor sheet side of the picker throat, the fingers arranged to interdigitate with the passing plants and to lift the bolls to the picker fingers on the opposite side of the throat.

DESCRIPTION OF THE PRIOR ART

In cotton pickers of the type under consideration the picker comprises a plurality of picker fingers which are arranged on a rotor and moved in a substantially horizontal orbit alongside a plant into which the fingers are adapted to penetrate and pursuant to rotation of the fingers about the individual axes to extract the seed cotton and withdraw the cotton into the harvesting mechanism wherein the cotton is removed from the spindles. It is well known that it is extremely difficult to harvest the cotton bolls which are located at the bottom of the plant. Normally, these plants are grown on hills but the branches will sag and position the cotton boll close to the ground. It is inadvisable to drag the harvester into the ground so that the fingers actually penetrate and roil the ground surface since this has a tendency not only to quickly wear out the spindles but also the dirty the cotton which may be entwined on the spindle.

In view of the foregoing difficulties, various attempts have been made to harvest the low-growing crops and this, in general, was either extremely expensive and generally ineffective or if the device employed static members would injure the plant. Since normally three pickings are available from the plant, it is inadvisable to bruise or mutilate the plant stalks to an extent which would inhibit the development of the crop along the upper branches thereof.

SUMMARY OF THE INVENTION

This construction relates to cotton pickers and more specifically to a mechanism for lifting or presenting the low bolls proximate to the picker fingers.

A general object of the invention is to provide a novel rotatable lifter device which comprises a plurality of radially-extending fingers on a disk rotatable on an upwardly and forwardly inclined axis disposing the plate with a downward and forward inclination such that as the fingers penetrate the stalk plants along the ground line and rotate pursuant to forward advance of the picker, upon which the boll lifter is carried, the rotation of the fingered disks will elevate the low-growing cotton into proximity of the lowermost spindles.

A further object of the invention is to provide a novel simple and effective plant lifter for harvesting low-growing cotton.

Another object of the invention is to provide a low boll lifter wheel which is biased toward the plant throat of the harvester and movable transversely of the plants passing therealong so as to be self-adjusting to the plant row and/or clear any obstructions.

These and other objects and advantages inherent in and encompassed by the invention will become more readily apparent from the specification and the drawings, wherein:

FIG. 1 is a horizontal sectonal view of a cotton picker embodying the invention;

FIG. 2 is a sectional view taken substantially on the line 2—2 of FIG. 1; and

FIG. 3 is a further sectional view taken substantially on the line 3—3 of FIG. 1.

Describing the invention in detail and having particular reference to the drawings, there is shown a cotton picker generally designated 2 which comprises laterally-spaced housing portions 3 and 4 which define a fore-and-aft extending longitudinal plant passage 5 therebetween and into which the rows of cotton plants are introduced purusant to forward movement of the machine over the field. The housing portion 4, which is of conventional construction is well known to those skilled in the art, comprises a conventional harvesting drum or picker assembly, generally indicated 7 which comprises a rotary structure orbiting about the vertical axis 8 and provided with a series of vertical bars 9 which carry a plurality of vertically-spaced picker fingers 10. The fingers 10 are introduced into the plant passage 5 through a series of slat bars 11 and orbit in the direction of the arrow shown in FIG. 1 and exit from the passage into the housing portion 4, whereas mechanism is provided as well known to those skilled in the art for removing the cotton from the fingers whereupon the fingers are again projected into the plant passage as well known to those skilled in the art. It will be noted that the lowermost spindles diagrammatically illustrated in FIG. 2, are spaced a considerable disance from the ground. Of necessity, this spacing must be maintained otherwise the spindles, at least for substantial part of the operation, would be plowing the ground and, therefore, would be admixing dirt with the cotton which may be wound on the spindles. The effect of plowing also increases the wear on the spindles and causes frequent breakage.

In order to gather the low-lying cotton from the plants, there is provided a boll lifter in the form of a freely rotatable fingered disk generally indicated 15 which comprises a center section 16 and a plurality of radially outwardly extending fingers 17. The center hub portions 16 is journalled on a spindle 18 which has a threaded lower end 19 passing through a transversely elongated slot 20 in the bottom plate 21 of the housing portion 3, the spindle portion 19 having a nut 22 threaded thereon which abuts against the lower edge 23 of a spacer 52 which at its upper end abuts a shoulder portion 24 of the spindle, the portion 24 abuts the eye 53 of a mounting arm 54 which slides upon the top side 25 of said bottom wall 21. It will be noted that the bottom wall 21 has a pair of vertically offset front and rear portions 26, 27 which are interconnected by a forwardly downwardly inclined intervening portion 29 on which spindle 18 is mounted. The spindle 18 is substantially normal to the plane of the portion 29 and presents an axis of rotation for the disk 15, via the center aperture 30, which is inclined upwardly and forwardly whereby the plane of the disk as represented by the line X—X inclines downwardly and forwardly thus the forward portion 32 of the disk is at a lower elevation than the rear portion 33. It will be noted that to provide an unobstructed upper surface, as contour 34 for the disk, head 35 of the spindle 18 is recessed within a counterbore 36 in the top of the disk. It will be observed that the disk 15 extends into the plant passage 5 and that the fingers 17 substantially span the space between the compressor sheet 38 which opposes the slat bars 11. It will also be noted that the slots or interdental spaces 40 between the teeth 17 admit the plant stalks, schematically represented at 41 in FIG. 1, therebetween and that the starwheel or finger or tooth disk 15 rotates pursuant to the intermeshing with the branches or trunk of the plants. It will be realized that as the star-wheel moves in the direction of the arrow shown in FIG. 1, any cotton or any branches in which the wheel is moved from front to rear will be elevated to a position proximate to the lower bank of spindles as well seen in FIG. 2. Thus, the spindles have an opportunity to snag the cotton from the lowermost parts of the plant without the necessity of bringing the spindles down to the elevation of the branches.

The arm or support rod 54 extends laterally of the plant row designated P to accommodate lateral shifting of the lift wheel to follow the displacement of the plants laterally of the row. The rod 54 is provided with an abutment 55 intermediate its ends and seats one end of a coil compression spring 56 which is sleeved on the rod and bears at its other end 57 against an abutment structural flange 58 of the housing portion 3, the rod extending through an opening 59 in flange 58 and having a threaded nut stop 60 thereon for adjusting the effective length of rod 54 and abuttable with the exterior side 61 of flange 58. Thus the travel of the wheel 15 is limited toward the rotor 7.

Similarly the rear drum 50 is provided with a laterally floating lift wheel 15R which is identical with wheel 15 and is mounted via rod 54 and spring 56 on the plate structure 65 and reciprocal through opening 66 in flange 67 of structural member 69. The rear wheel is inclined downwardly and forwardly and rotates in the direction of the arrow (clockwise) FIG. 1.

What is claimed is:

1. A cotton harvesting mechanism having a forward end and a plant passage extending rearwardly from the forward end, a picker rotor alongside the passage having cotton picking spindles movable into cotton plants in the passage for extracting cotton therefrom, and a cotton boll lifter means in vertical alignment with the spindles in the passage having means for lifting low-lying cotton and movable upwardly and rearwardly for lifting the cotton and presenting the same to said spindles.

2. The invention according to claim 1 and said lifter means comprising a plant-engaging movable structure presenting a lifting surface inclined upwardly and rearwardly toward the spindles.

3. The invention according to claim 1 and said lifter means comprising a fingered plate mounted for rotation about an upwardly and forwardly inclined axis.

4. In a cotton harvester having a frame and laterally spaced portions defining a plant passage therebetween having front and rear ends, a picker drum mounted on one of said portions and having a plurality of picking spindles mounted for movement in substantially horizontal orbits into and out of said passage from front to rear thereof and attendantly extracting cotton from cotton plants in the passage, a low cotton boll lifter wheel mounted on the other portion on an axis inclined upwardly toward the forward end of the passage, and said wheel having radially extending fingers, a section of the wheel extending into the passage below and in vertical alignment with the spindles in the passage and movable through engagement with plants in the passage in a rearward direction and providing a top cotton boll engaging liftingsurface inclined upwardly and rearwardly toward said spindles.

5. The invention according to claim 4 and said section of the wheel movable into the passage ahead of the spindles and exiting at its rear away from the spindles.

6. The invention according to claim 5 and a compressor sheet assembly on the portion mounting the lifter and movable generally horizontally for exposing varying areas of said lifter.

7. The invention according to claim 1 and said lifter comprising a disk-like member, means mounting the member on an upright forwardly inclined axis, said member having peripheral outwardly directed fingers for interdigitating with plants engaged thereby to provide a positive drive for the member in response to forward movement of the harvester.

8. The invention according to claim 7 and said mounting means for the dish-like member comprising means for yieldably biasing the member toward the plant passage.

9. The invention according to claim 8 and said harvesting mechanism having a frame, and biasing means comprising spring means stressed between the frame and the means mounting said member.

10. The invention according to claim 1 and said lifter means orbital in a diagonal plane extending upwardly and rearwardly from adjacent the ground to adjacent the spindles.

References Cited
UNITED STATES PATENTS

| | | | |
|---|---|---|---|
| 2,832,185 | 4/1958 | Gardner | 56—42 X |
| 3,528,232 | 9/1970 | Fachini | 56—44 |
| 2,635,409 | 4/1953 | Thomann | 56—44 |
| 3,175,346 | 3/1965 | Tracy et al. | 56—44 |
| 3,385,042 | 5/1968 | Christie et al. | 56—44 |

LOUIS G. MANCENE, Primary Examiner

J. N. ESKOVITZ, Assistant Examiner